Jan. 8, 1963  E. D. GADDES  3,072,812
PERMANENT MAGNET MOTOR
Filed Oct. 2, 1958  2 Sheets-Sheet 1

INVENTOR.
EDWARD D. GADDES
BY Victor J. Evans & Co.
ATTORNEYS

Jan. 8, 1963

E. D. GADDES 3,072,812

PERMANENT MAGNET MOTOR

Filed Oct. 2, 1958

INVENTOR.

EDWARD D. GADDES

BY Victor J. Evans & Co.

ATTORNEYS

//  
United States Patent Office 3,072,812  
Patented Jan. 8, 1963

3,072,812  
PERMANENT MAGNET MOTOR  
Edward D. Gaddes, 3717 Crestview Drive,  
Nashville, Tenn.  
Filed Oct. 2, 1958, Ser. No. 764,989  
1 Claim. (Cl. 310—154)

This invention relates to motors, generators, power driving wheels, and the like, and in particular a rotor having a plurality of segments therein positioned to operate between magnets in which the segments are carried on a band of insulating material and in which the band is carried by a plurality of arcuate arms pivotally mounted on the rotor whereby the segments are rotated with a floating action between permanent magnets to provide an electric motor or a generator.

The purpose of this invention is to provide an electric motor in which the power and speed are changed without the use of gears or pulleys and in which the direction of rotation of the rotor of the motor is reversed by changing the voltage polarity.

Substantially all electric motors include a rotor and a magnetic field in which the rotor rotates and whereas the speed of some motors may be controlled by a rheostat or other current controlling device it has been found difficult to vary the speed of a motor or generator by changing the relative positions of parts within the motor assembly. With this thought in mind this invention contemplates a motor having a rotor with a plurality of U-shaped segments, each having a double coil thereon in which the segments are positioned to travel in a magnetic field created by permanent magnets and in which the speed of the rotor and direction of rotation thereof is controlled by relative positions of the electro-magnets and permanent magnets.

The object of this invention is, therefore, to provide means for constructing an electric motor wherein electro-magnets rotate between permanent magnets wherein the speed of rotation of the rotor and also the direction of rotation thereof are readily controlled.

Another object of the invention is to provide an electric motor in which the power and speed of the motor are controlled by the radius of the rotor in relation to magnets thereof.

Another important object of the invention is to provide an electric motor in which the direction of rotation thereof is controlled by the voltage polarity.

A further object of the invention is to provide an electric motor in which the power and speed are in proportion to the radius of the rotor as compared to the magnets and wherein the direction of rotation is reversed by changing the voltage polarity in which the motor is of substantially simple and economical construction.

With these and other objects and advantages in view the invention embodies a wheel or cylindrical housing having segments with double coils thereon mounted on a shaft providing a rotor with the segments positioned to coact with permanent magnets or field windings in which the speed and power of the motor are in proportion to the diameters of the rotor and magnets and in which the direction of rotation is controlled by changing the voltage polarity.

Other features and advantages of the invention will appear from the following description taken in connection with the drawings, wherein.

Figure 1:
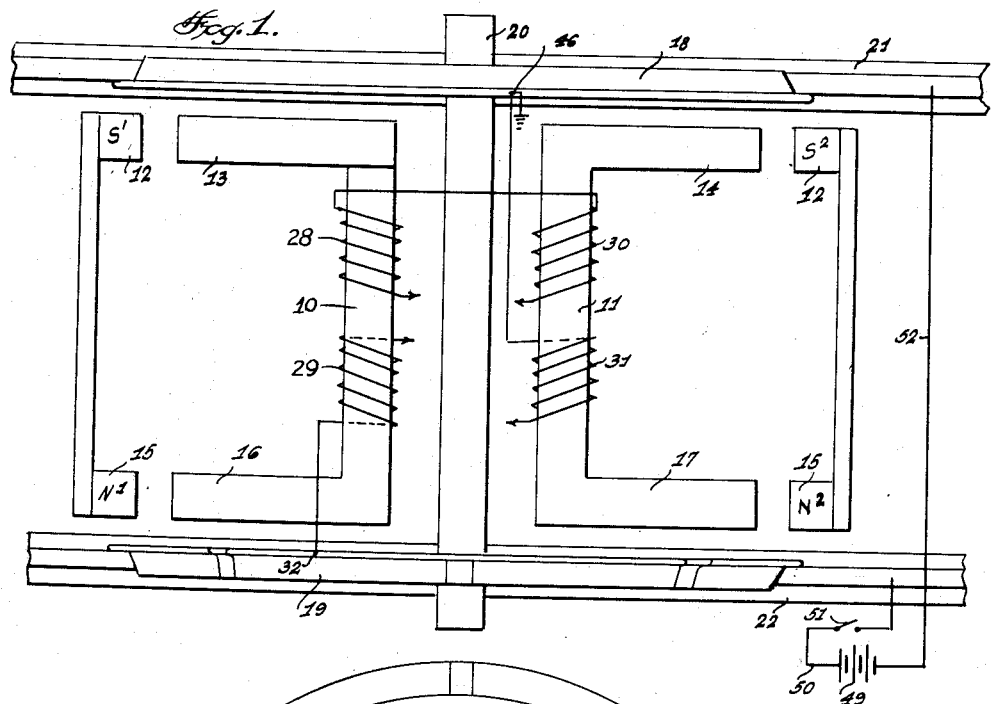
FIGURE 1 is a plan view showing the motor positioned between wheels mounted on rails and showing two of eight commutator segments positioned between permanent magnets and also between wheels in which each segment includes two coils and in which the coils are connected through the wheels to the rails to provide electro-magnets.
Figure 3:
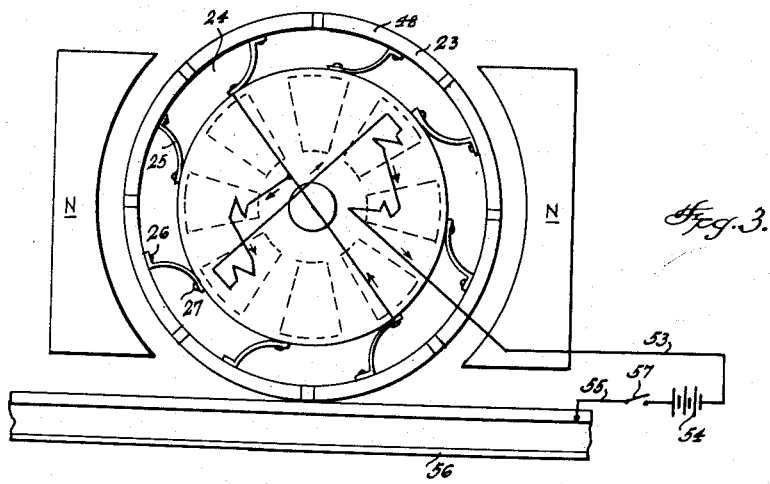
FIGURE 3 is a side elevational view, similar to that shown in FIGURE 2 showing the segments suspended from the rotor by arcuate arms to provide the necessary floating action to compensate for irregularity in a track upon which the wheels may be mounted.
Figure 4:
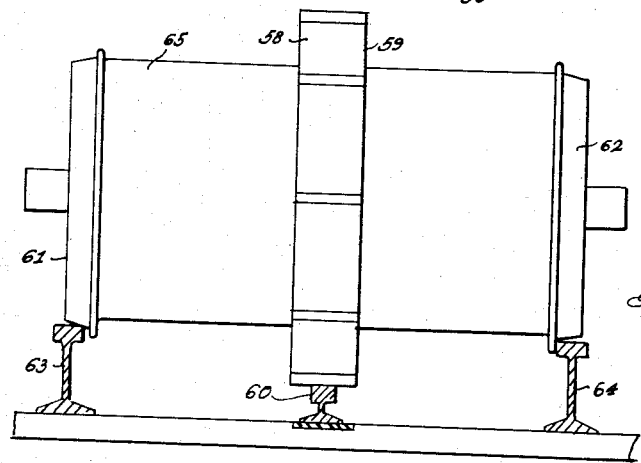
FIGURE 4 is a side elevational view of the motor showing the method of suspending the motor on a three rail track.
Figure 5:
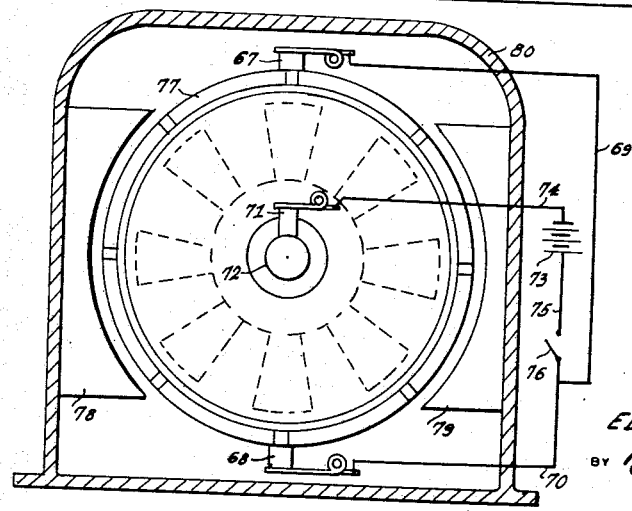
FIGURE 5 is a side elevational view, similar to that shown in FIGURE 3 showing brushes positioned to contact the commutator bar and segments.

Referring now to the drawings wherein like reference characters denote corresponding parts the motor includes a plurality of U-shaped electro-magnets such as the magnets 10 and 11 shown in FIGURE 1, a plurality of circumferentially spaced radially disposed magnets 12 positioned to coact with arms 13 and 14 of the magnets 10 and 11, similar magnets 15 positioned to coact with arms 16 and 17 of the magnets, wheels 18 and 19 mounted on a shaft 20 and positioned to travel on rails 21 and 22; and, as illustrated in FIGURES 3, 4, and 5, segments 23 on a continuous band 24 of insulating material, with the segments carried by arcuate straps 25, the outer ends of which are secured to the segments at the points 26 and the inner ends of which are secured to the rotor in which the electro-magnets are positioned by suitable fasteners 27.

The electro-magnet 10 is provided with coils 28 and 29 and the magnet 11 with similar coils 30 and 31. One end of the coil 29 is connected to the flange of the wheel 19, as shown at the point 32 and the opposite end is connected by a wire 33 to the end of a coil 30. The intermediate portions of the coil are connected, as illustrated in FIGURE 2 and the inner end of the coil 31 is connected by a wire 34 to the flange of the wheel 18.

Figure 2:
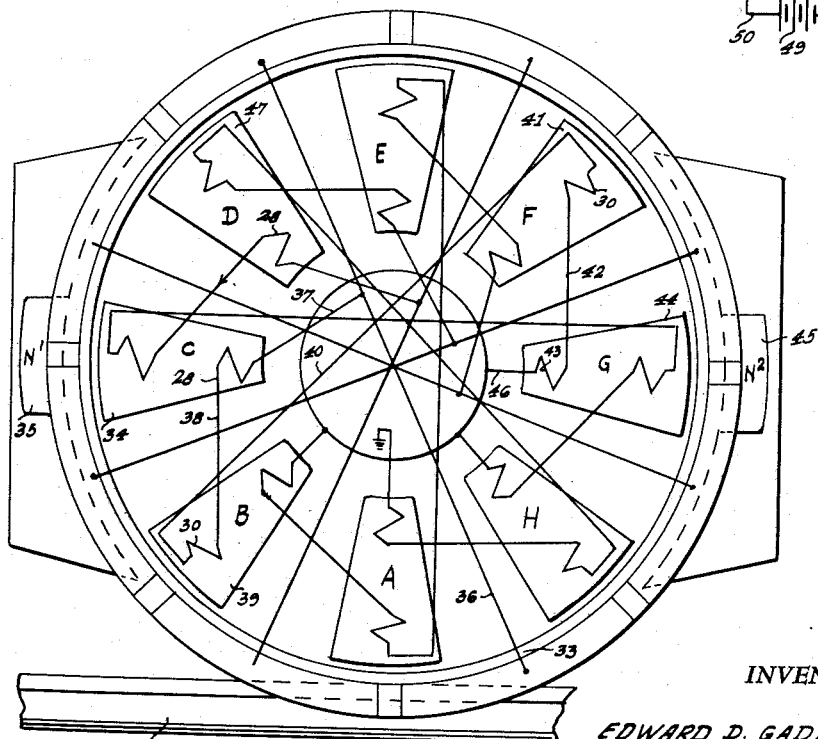
FIGURE 2 is a side elevational view showing a plurality of segments mounted in a rotor with the rotor positioned between permanent magnets and in which wiring diagrams of the coils of the magnets are shown.

In the diagram illustrated in FIGURE 2 current flowing from rail 22 through segments 23 energizes the coil 28 of the electro-magnet 34 to polarize an end magnet and thus be repelled by the end M–1 magnet 35 which is a permanent magnet. One of the segments 23 is connected to the coil 28 by wires 36 and 37 and the opposite terminal of the coil 28 is connected by a wire 38 to a terminal of a coil 30 of another of the segments 23 whereby the electro-magnet of the last-mentioned segment 39 is polarized as an S magnet which will be attracted to the permanent magnet 35. By the same means the outer terminal of the coil 30 is connected by a wire 40 to a coil 30 of the electro-magnet 41 and the opposite terminal of the coil 30 is connected by a wire 42 to a coil 43 in still another of the segments 23. The current causes the electro-magnet 41 to polarize as an S magnet attracted to a permanent magnet N–2, as indicated by the numeral 45. The opposite terminal of the coil 43 is grounded as shown at the point 46 in FIGURES 1 and 2. Similar circuits are carried through the rotor whereby the electro-magnets of the segments are repelled and attracted by the permanent magnets with the poles N and S.

This repelling and attracting action of the magnets causes the wheels to rotate in the direction of the arrow. The direction of rotation may be changed by reversing the voltage polarity of the magnets through the current supplied by the rails or other means. The rotor, or motor-wheel does not have a dead center position even though two of the segments may be in contact with the rail and, consequently, receiving current at the same time.

The operation of the device is as follows:

The coil 30 of the segment to which it is connected is polarized S and is attrached to N–1. The coils in the segment G are both polarized at the same time, one N and the other S so that their magnetic effect is neutralized whereby they have very little reaction with permanent magnet N–1. In segment N–2, the coil 28 is polarized in N and, consequently, repelled by N–1. Similar action also takes place in the electro-magnet FG and H. As shown in FIGURE 3 the outer ends of the electro-magnet coils are connected to the rail on the opposite side or voltage source by a ring 48 as indicated by the ground connection 46 in FIGURE 1.

The speed and power produced by this motor-wheel is governed by the radius of the electro-magnets A to H as compared to the radius of the wheel rims or diameter of the motor housing. The smaller the wheel radius, as compared to the magnets, the more power will be produced and at the same time the speed will be decreased.

Electric current may be supplied to the rotor or motor-wheel from any suitable source and, as an example, the rail 22 is connected to one terminal of a battery 49 by a wire 50 having a switch 51 therein and the opposite terminal of the battery is connected by a wire 52 to the opposite rail 21. In FIGURE 3 a typical current supply connection is illustrated wherein the ground point 46 of the coils of each of the segments is connected by a wire 53 to a battery 54 and the opposite terminal of the battery is connected by a wire 55 to a rail 56. The wire 55 is provided with a switch 57.

In the modification illustrated in FIGURE 4 the segments 58 of a commutator wheel 59 travel on a third rail 60, similar to the rail 21 of the design shown in FIGURE 1 with wheels 61 and 62 traveling on rails 63 and 64. In this design the segments including the electro-magnets are mounted in a cylindrical housing 65 positioned between the wheels 61 and 62 and also carried on a shaft 66.

The motor or rotor-wheel may be converted into a high voltage D.C. generator by adding electro-magnets to the wheels, replacing the rail connection with one voltage collecting brush, and connecting the ground 46 to the wheel axle whereby the axle bearings will provide the other voltage collecting point.

As illustrated in FIGURE 5 two brushes 67 and 68, which are connected by wires 69 and 70 are provided and these brushes coact with a third brush 71 on the wheel axle 72 whereby with the wheel axle driven by turbo power means current is supplied for operating machinery or the like, such as being supplied to a battery 73 to which the brush 71 is connected by a wire 74 and to the opposite terminal of which the brushes 67 and 68 are connected by a wire 75 in which a switch 76 is provided. In this design segments 77, providing a commutator bar are mounted to rotate between magnets 78 and 79 and the device is incorporated in a housing 80. In this arrangement permanent magnets 78 and 79 may be replaced by electro-magnets if desired.

In the design shown in FIGURE 5 voltage is fed in through either brush 67 or 68 and returned through brush 71 or the current may be fed through both brushes 67 and 68 and returned through the brush 71. Operating by outside motive power the device will generate D.C. current which may be taken off through the brushes 67 or 68 and the brush 71.

With the parts positioned as illustrated and described a rotational movement of the permanent magnets in relation to the electro-magnets in one direction causes a slowing down of the rotor and a similar movement in the opposite direction results in a speeding up of the rotor or wheel. The accelerating or retarding of the rotor is also accomplished by a rheostat.

It will be understood that other modifications, within the scope of the appended claim, may be made in the design and arrangement of the parts without departing from the spirit of the invention.

What is claimed is:

In an electric motor device including a segmented first wheel mounted on one end of a rotatable axle and adapted to roll on a current conducting rail and a conductive second wheel mounted on the other end of said axle and adapted to roll on another current conductive rail, a permanent magnet arranged parallel to said axle, a plurality of radially arranged U-shaped electro-magnets carried by said axle for rotation therewith, each of said electro-magnets having the free ends of its legs registrable in turn with the ends of said permanent magnets, a first coil on the bight of each electro-magnet and wound in one direction, a second coil on the bight of each electro-magnet and wound in the opposite direction to the first coil, a first wire connecting one end of said first coil to a segment of the first wheel, a second wire connecting the other end of said first coil to one end of the second coil on the next adjacent electro-magnet, and a third wire connecting the other end of the last named second coil to said second wheel, said first coil when said segment is in rolling engagement on the associated rail being adapted to be energized so as to magnetize said electro-magnet with the legs thereof polarized to repel the adjacent ends of said permanent magnet, the second coil of the next adjacent electro-magnet being adapted to be simultaneously energized so as to magnetize said next adjacent electro-magnet with the legs thereof polarized to attract said permanent magnet ends.

References Cited in the file of this patent

UNITED STATES PATENTS

| | | |
|---|---|---|
| 14,598 | Carpenter | Apr. 8, 1856 |
| 1,857,209 | Moore | May 10, 1932 |
| 1,862,248 | Wesnigk | June 7, 1932 |
| 2,058,523 | Stearns | Oct. 27, 1936 |
| 2,457,637 | Brailsford | Dec. 28, 1948 |
| 2,632,284 | McDonald | Mar. 24, 1953 |
| 2,672,564 | Krasno | Mar. 16, 1954 |
| 2,916,684 | Schneider | Dec. 8, 1959 |